UNITED STATES PATENT OFFICE.

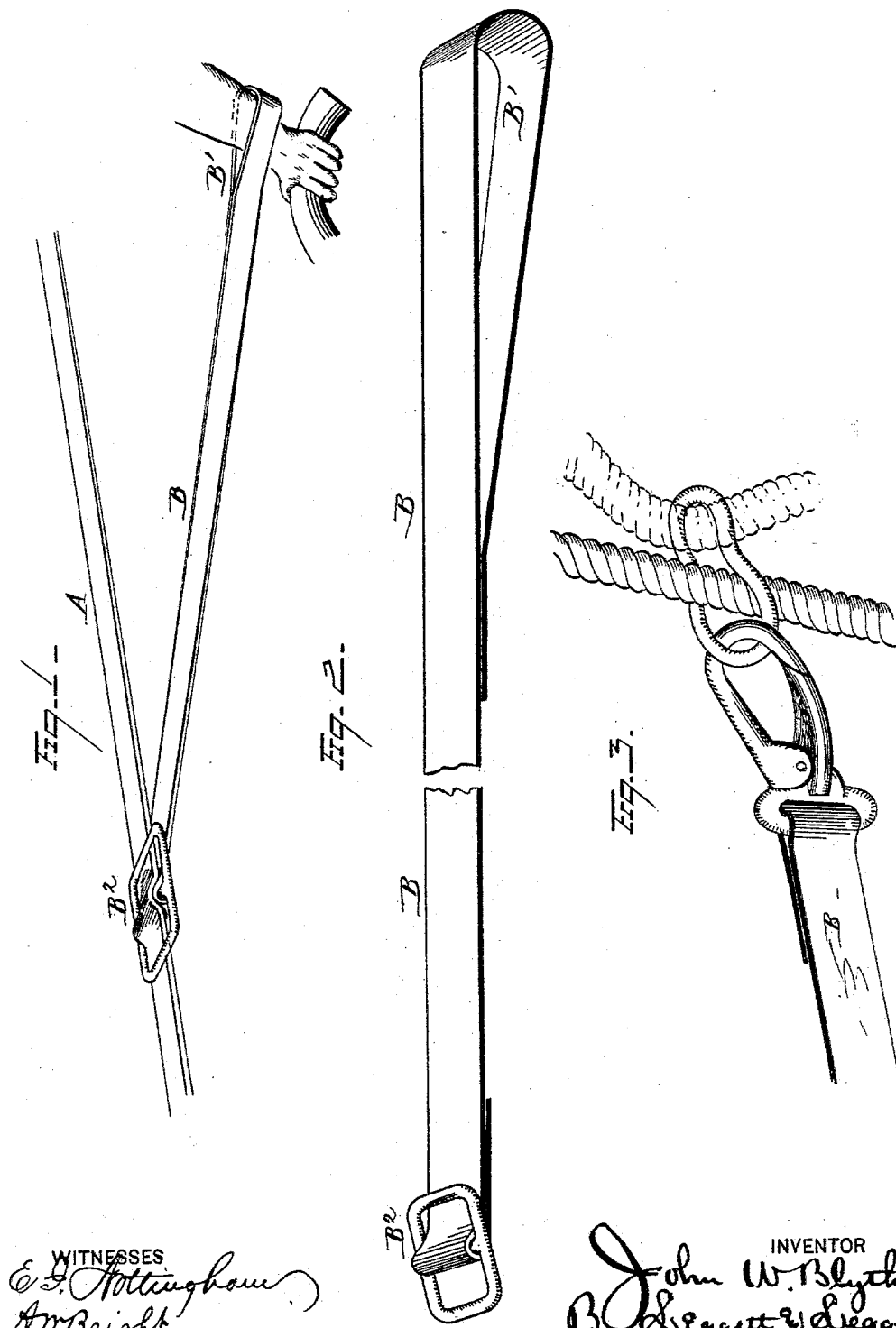

JOHN W. BLYTH, OF MENTOR, OHIO.

IMPROVEMENT IN PLOW-HARNESS.

Specification forming part of Letters Patent No. 210,836, dated December 17, 1878; application filed September 18, 1878.

*To all whom it may concern:*

Be it known that I, JOHN W. BLYTH, of Mentor, in the county of Lake and State of Ohio, have invented certain new and useful Improvements in Plow-Harness; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in plow-harnesses; and consists in providing the harness with a double rein, so that, while the rein proper may pass around the neck, shoulder, or waist of the driver, the attached portions may join the main lines a couple of feet forward of the handles and pass back to the handles, so that the plowman may control the team or horse without loosening his hands from the plow.

In the drawings, Figure 1 is a view of my improvement attached to the rein, showing my invention in use. Fig. 2 is an enlarged view of one of my attachments. Fig. 3 is a similar view, showing it as adapted for attachment to rope lines.

It has been the custom heretofore for the driver, in plowing, to support the lines by slipping them over his head, or around his body, or over one shoulder and beneath the other arm, from which support they extend forward to the bits. This has usually required the plowman, when he wished to guide his horse to the left or right, to release his hand from the plow in order to catch and draw the rein. Moreover, the distance at which the rein naturally hangs above the handles renders a hand-hole attached closely to the rein impracticable for this purpose, for that would cause a constant upward lift upon the hands, which would be tiresome, and might prevent a proper handling of the plow. I therefore propose to make an extra line attachment for each hand. This line attachment is shown at B as attached to the line A. The extra line or attachment B should be a couple of feet (more or less) in length, so that the draft upon the piece B shall be directly from the bits, and not upward. At the rear ends of the attachments B there should be formed loops $B^1$, through which the hand may be readily passed. But this loop should not be so large as to be liable to be jerked or dropped off from the hand, for the hand is engaged in holding the plow-handle; and there is no gripe upon the loop, except as its size causes it to bind upon the hand in use.

The forward end of the piece B is provided with a buckle of any nature; but I prefer generally that it shall be such as shall permit adjustment of the piece forward and back upon the lines by simply slipping the line through it, and without puncturing the line.

If rope lines be used, the end of the piece B may be provided with a snap, $B^2$, engaging a link made large enough at one end to permit the rope to slip through freely, but diminished at the other end to wedge and hold the line from slipping.

The operation of the device is apparent. Whenever it is desired to use the harness for plowing, these extra lines are attached and adjusted to their proper places. The lines proper are then slipped over the head or around the body, and the hands, passed through the loops $B^1$, are applied to the handles. The horses may now be guided either way by simply sliding the hands, and without releasing the handle of the plow.

These extra lines or plowing attachments may be made of fabric or leather, or of any other suitable material.

The loops also form a ready means of fastening the lines to the plow when the plowman leaves his plow; or, when not plowing, the extra lines may be disengaged from the main lines and be slipped over the handles until ready for use.

What I claim is—

The combination, with the driving-reins of a harness, of supplemental driving-rein attachments, each consisting of the strap B, provided with engaging device $B^2$, or equivalent device, and hand-loop $B^1$, substantially as set forth.

In testimony whereof I have signed my name to this specification in the presence of two subscribing witnesses.

JOHN W. BLYTH.

Witnesses:
F. TOUMEY,
W. E. DONNELLY.